United States Patent Office 3,438,582
Patented Apr. 15, 1969

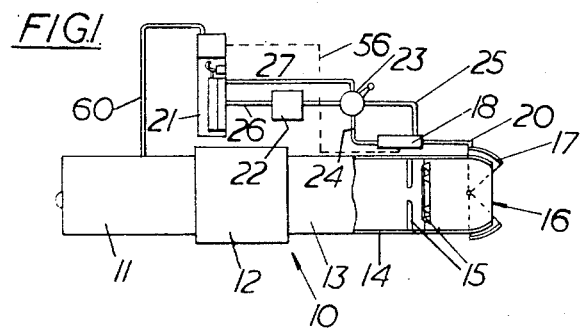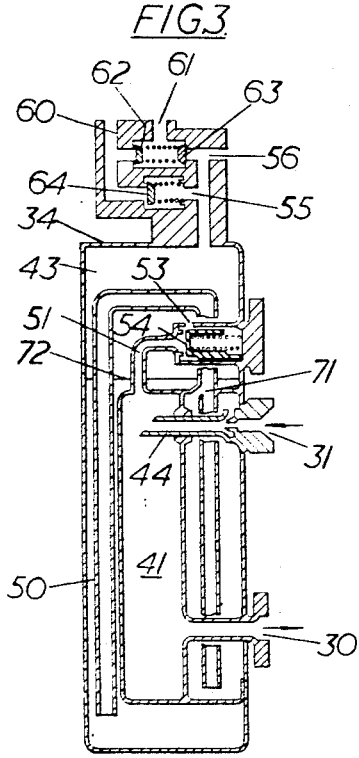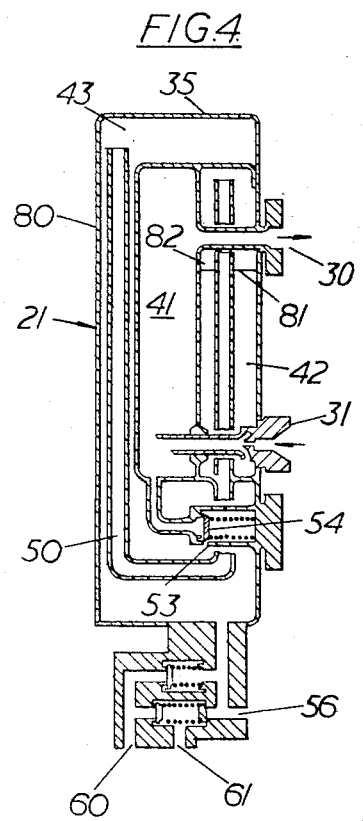

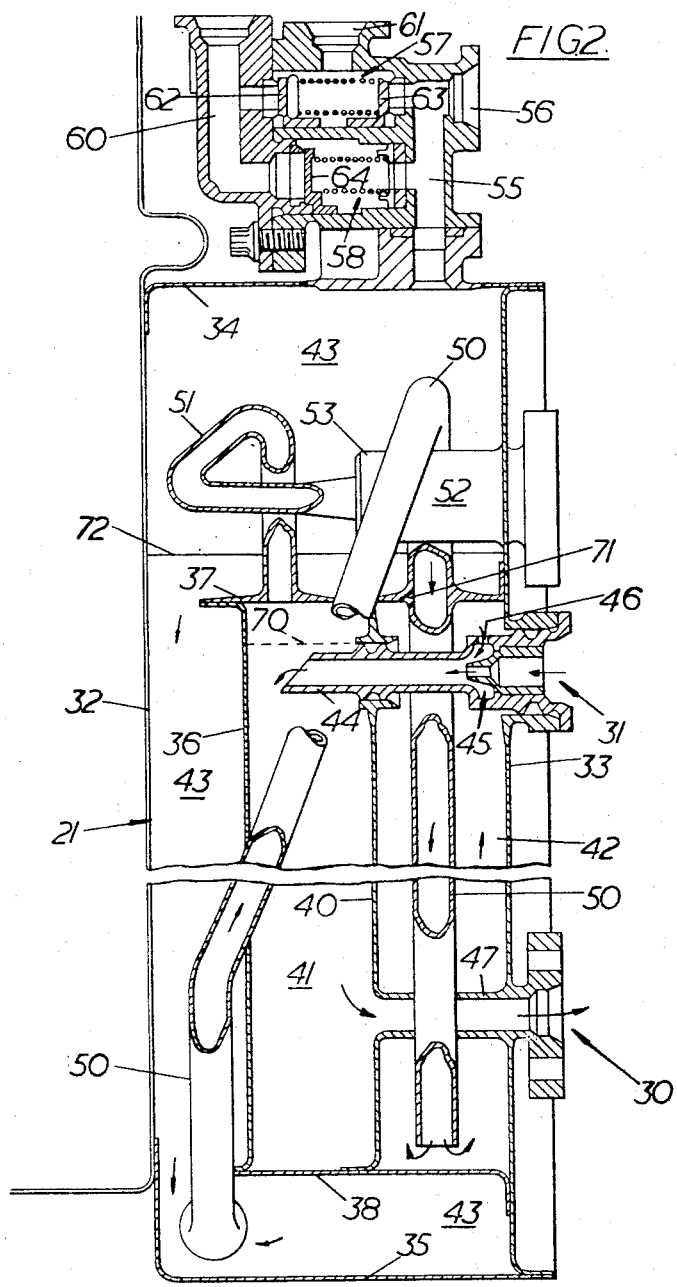

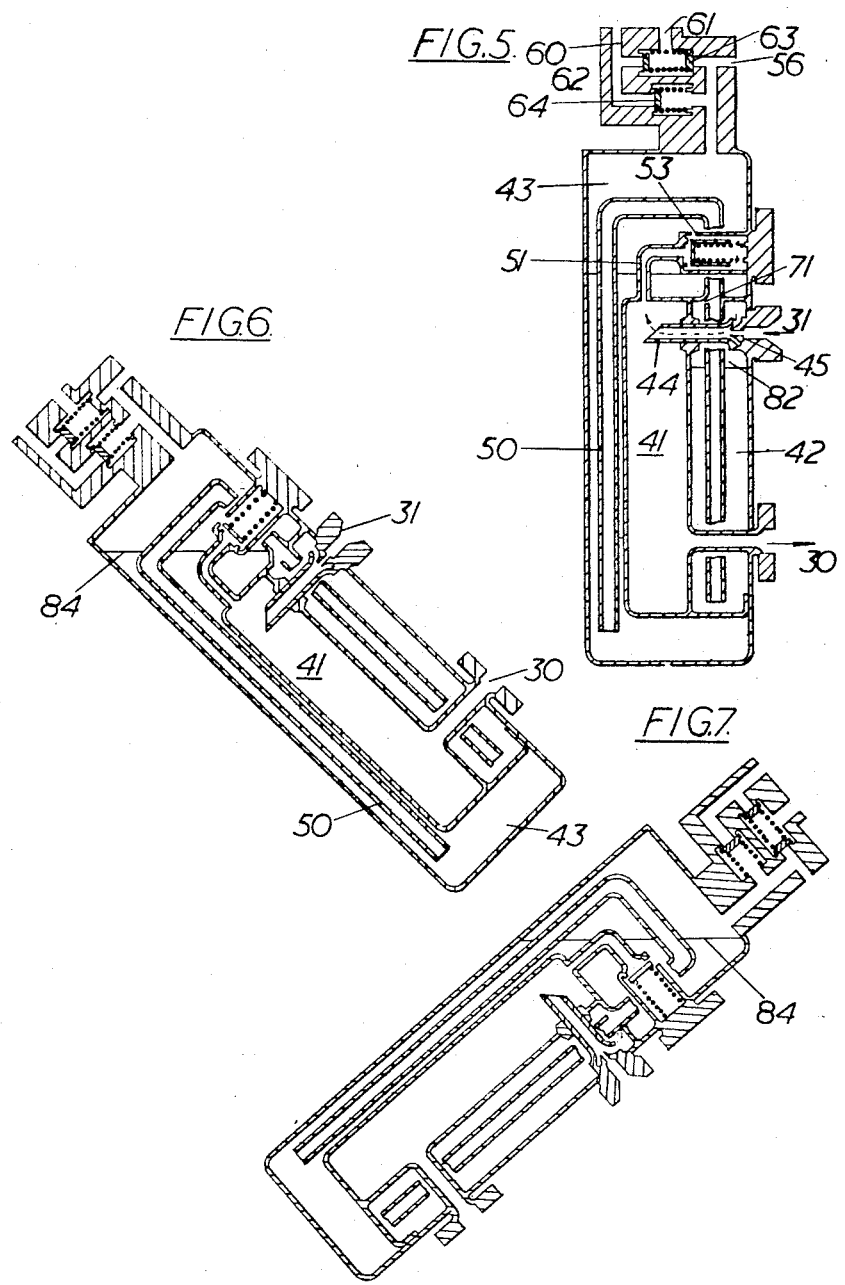

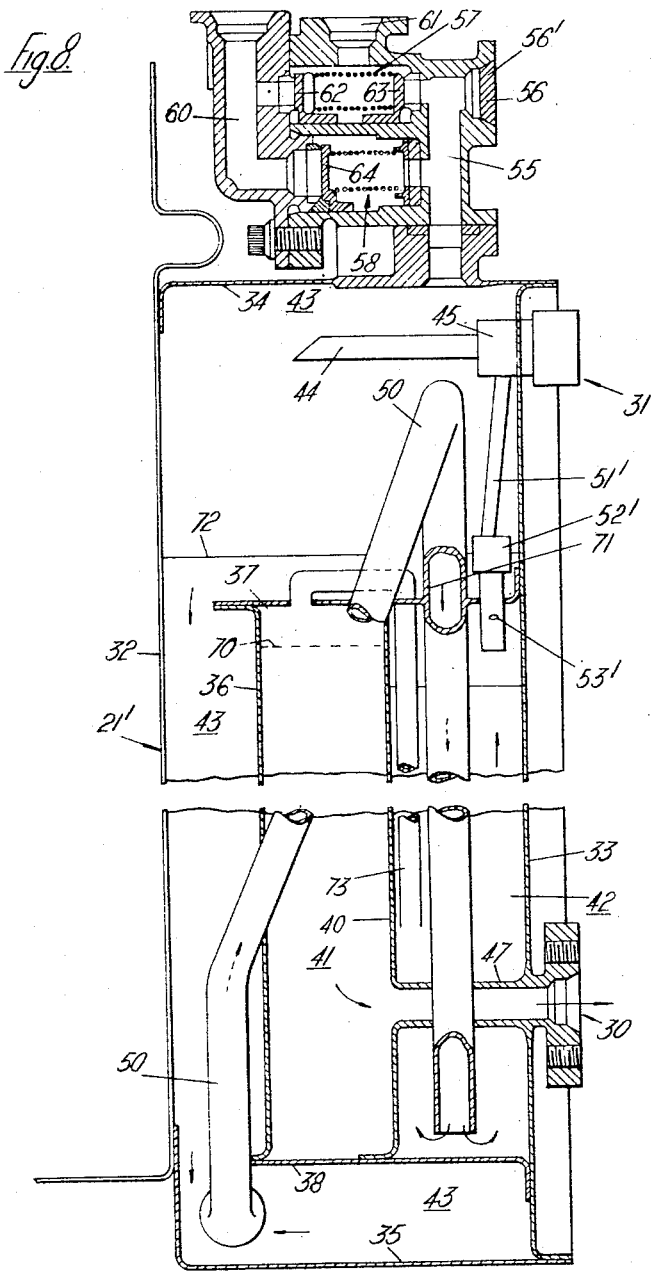

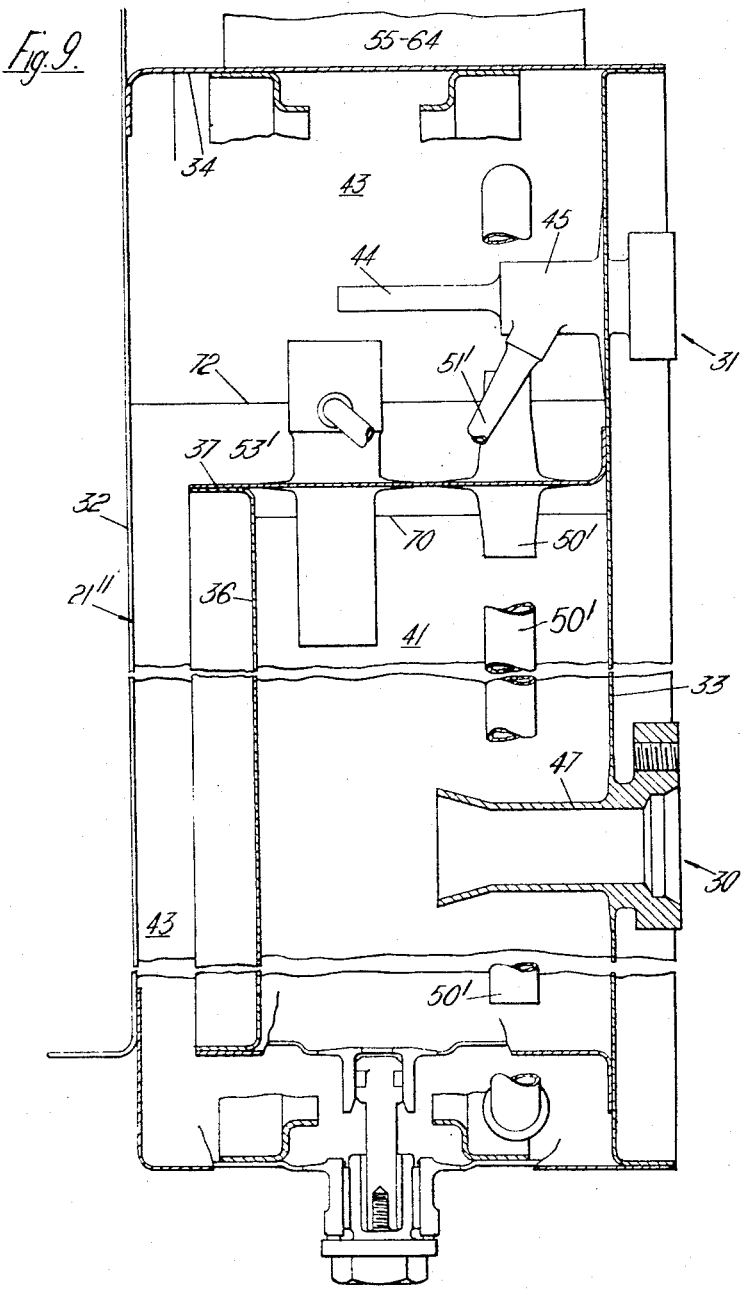

3,438,582
TANKS FOR HOLDING LIQUIDS
Norman R. Robinson, 132 Whitaker Road, Derby, England; Donald M. Anley, 3 Park Road, Hucknall, England; and Charles S. Petrie, 134 Locko Road, Spondon, Derby, England
Continuation-in-part of application Ser. No. 441,493, Mar. 22, 1965. This application Dec. 6, 1966, Ser. No. 599,534
Claims priority, application Great Britain, Mar. 31, 1964, 13,294/64
Int. Cl. B63h *11/10;* F02g *1/00;* B67d *5/54*
U.S. Cl. 239—265.19                 14 Claims

ABSTRACT OF THE DISCLOSURE

An oil tank comprises a plurality of interconnecting chambers, an oil inlet and an oil outlet, by which oil may be supplied to and withdrawn from the chambers, the oil inlet and outlet both communicating directly with one of the chambers and an air outlet for the chambers. A venturi ejector pump is provided in the oil inlet which passes through a second of the chambers so that liquid flowing through the oil inlet draws further oil from the second chamber by the action of the venturi ejector pump. The oil passing into this first chamber urges air out through the air outlet and maintains the first chamber substantially full of oil in any disposition of the tank.

---

This invention concerns tanks for holding liquids and is a continuation-in-part of application Ser. No. 441,493, filed Mar. 22, 1965, now abandoned.

According to the present invention there is provided a tank for holding liquids, said tank comprising a plurality of interconnecting chambers, a liquid inlet and a liquid outlet by which liquid may be respectively supplied to and withdrawn from said chambers, the liquid outlet communicating directly with one of said chambers to draw liquid therefrom, and an air outlet for said chambers, said liquid inlet including a venturi ejector pump such that liquid flowing therethrough into said chambers causes air to pass out of said chambers through said air outlet, and maintains at least said one chamber substantially full of liquid.

Preferably, in the said tank the arrangement is such that at least said one chamber is maintained full or substantially full of liquid in any disposition of said tank.

In one preferred embodiment, the liquid inlet and outlet both communicate with a first chamber, the liquid inlet passing through a second chamber whereby the liquid flowing therethrough draws further liquid from said second chamber by the venturi ejector pump, the combined liquid and further liquid passing into the first chamber urging air out through said air outlet and maintaining the first chamber substantially full. There may also be provided a third chamber adapted to contain liquid, and communicating with said second chamber to supply liquid thereto. The second and third chambers may be interconnected by a U-tube which is inverted in the normal disposition of the tank.

In an alternative embodiment the tank comprises two interconnecting chambers, and the air outlet is in said one chamber, the other chamber communicating with said one chamber to supply liquid thereto, the liquid inlet communicating with the other chamber, and the venturi ejector pump being connected to said air outlet whereby flow of liquid into said other chamber draws air from said one chamber and thus induces liquid to flow into said one chamber, maintaining it substantially full. Said two chambers may be interconnected by a U-tube which is inverted in the normal disposition of said tank.

Preferably one of said chambers is only partially filled with liquid, the remainder being filled with compressed air or gas to pressurise the liquid in said chambers and urge said liquid into said one chamber. The said air outlet may be a one-way air valve which permits air to flow from one of said chambers into said chamber which is only partially full.

In use, the inlet and outlet may be connected to a closed external liquid flow circuit, means being provided for returning to said tank at least some of the liquid lost from said external circuit.

The tank, in any of its preferred forms, may be adapted for use on a gas turbine engine, said tank being pressurised with compressed air from the compressor equipment of said engine to pressurise the liquid. Thus the tank may be adapted to supply liquid to rams for operating a variable area nozzle on said engine under all prevailing conditions, e.g. both positive and negative "g" conditions.

The invention also includes a gas turbine engine provided with a tank as set forth above.

It will be appreciated that by maintaining the said first chamber full or substantially full of liquid, air is prevented from entering the said external circuit and thus "spongy" operation of said rams is prevented.

The invention is illustrated, merely by way of example, in the accompanying drawings, in which:

FIGURE 1 is a diagrammatic view of a gas turbine jet propulsion engine provided with a tank according to the present invention, FIGURE 2 is a part-sectional elevation of a tank according to the present invention, FIGURES 3 to 7 are diagrammatic views of the tank of FIGURE 2, showing it in use in various dispositions, and FIGURES 8 and 9 are diagrammatic views similar to FIGURE 2 of two further embodiments of tanks according to the present invention.

Referring to FIGURES 1 to 7 of the drawings, a gas turbine engine 10 comprises compressor equipment 11, combustion equipment 12, turbines 13 and jet pipe 14. Reheat combustion equipment 15 is provided in the jet pipe 14, and a variable area outlet nozzle 16 is provided, two pivoted clam-shell type doors 17 being pivoted to the jet pipe 14. Rams 18 are connected by rods 20 to the doors 17 and are supplied with oil under pressure from a tank 21 via an engine-driven pump 22 and a two-way valve 23. Two pipes 24, 25 are provided for each ram 18 such that oil may be supplied to and extracted from opposite sides of the ram in turn to thereby move the rods 20 axially. A feed pipe 26 and return pipe 27 are respectively connected to an outlet 30 and inlet 31 of tank 21 (see FIGURES 2 to 7).

The tank 21 comprises an outer casing constituted by side panels 32, 33 and end panels 34, 35 and an inner casing constituted by side panels 36 and part of 33, and end panels 37, 38. The inner casing is divided internally by a wall 40, the divided portions of the inner casing providing first and second chambers 41, 42 respectively. The inner and outer casings define between them a third chamber 43.

Inlet 31 to tank 21 is connected by a tube 44 directly to first chamber 41. A venturi nozzle or ejector pump 45 is provided in tube 44 and second chamber 42 communicates with tube 44 via this venturi nozzle 45, through aperture 46.

Outlet 30 of tank 21 communicates directly with first chamber 41 by a tube 47.

A U-tube 50 interconnects second and third chambers 42 and 43. The tank 21 is shown in its normal disposition in FIGURE 2, and, in this disposition, it will be seen that U-tube 50 is inverted, having its ends projecting into chambers 42 and 43 and disposed adjacent the lowermost portions thereof.

First chamber 41 is provided at its uppermost end (as seen in FIGURE 2) with a tube 51 by which it communicates, via a one-way air valve 52, with third chamber 43. Air valve 52 comprises a vent 53, flow through which is controlled by a spring-biased valve obturating member 54 (see FIGURE 3).

Apart from the interconnections between chambers 41, 42 and 43 mentioned above, these chambers are sealed from one another.

The upper end of third chamber 43 (as seen in FIGURE 2) communicates via a duct 55 with a leakage return duct 56 and, via two valves 57, 58, with a supply duct 60 which supplies compressed air from compressor equipment 11 of the engine. Valve 57 communicates with a vent pipe 61 and is provided with two spring-biased valve obturating members 62, 63. Valve 58 is provided with a single spring-biased valve obturating member 64.

To fill the tank 21 with oil, a supply hose is connected to outlet 30 and oil is pumped through tube 47 into first chamber 41. Oil will rise in chamber 41, purging it of air, which will flow in the directions opposite to that shown by the arrows in FIGURE 2 firstly into second chamber 42 via tube 44 and then into third chamber 43 via tube 50 and also via vent 53 if pressure is sufficient to lift valve 52. Valve obturating member 63 is biased to the operating pressure of the system, and, if this is less than that prevailing in the purged air, the excess air passes from third chamber 43, through duct 55, valve 57 and vent 61 to atmosphere. The tank 21 is filled with oil when engine 10 is not running, and thus there will be no air under pressure supplied via supply duct 60 to tank 21.

In filling tank 21, oil will rise in first chamber 41 to the level indicated by broken line 70, the space above this level and in tube 51 being filled with air which may not escape from the chamber if the pressure is less than that required to open valve 52. Oil will then flow through tube 44 and aperture 46 into second chamber 42. As second chember 42 fills with oil, oil will flow through tube 50 (via its lower end and via an air vent 71 in tube 50 when the air has been expelled from chamber 42) and into third chamber 43. A pipe (not shown) connects third chamber 43 to an oil level indicator (not shown). When the oil has reached a level such as that indicated by line 72, the supply of oil is removed. Thus, in its "full" state, tank 21 will be full of oil apart from air spaces above level 70 in the first chamber 41 and above level 72 in third chamber 43.

Outlet 30 is connected to pipe 26 (inlet 31 being connected to pipe 27), and the external circuit comprising pipes 24 to 27, pump 22 and rams 18 checked to ensure that it is full of oil. Upon starting engine 10, the pump 22 is driven, and at the same time compressed air will flow through duct 60 through valve 58 to pressurize the air space in the third chamber 43. Valve members 62 and 64 are spring-biased to open such that a portion only of the air under pressure in duct 60 is permitted to flow into third chamber 43. The third chamber 43 is pressurised to avoid cavitation in the pump 22 when the engine 10 is operating at high altitude. The pump 22 returns oil to the tank 21, through the inlet 31, as indicated by the arrows, at the same time energising the venturi nozzle 45 and causing the pressure of the oil in first chamber 41 to rise. The air trapped above the level 70 in the first chamber 41 is therefore pressurised. The pressure produced in the first chamber 41 by the venturi nozzle 45 is sufficient to lift the valve 52, and air passes through the vent 53 until there is no air trapped in tube 51, and the whole of the first chamber 41 and tube 51, as far as vent 53, is full of oil. Vent 53 is designed to permit the flow of oil or air in one direction only, that is, into the third chamber 43, no air or oil being able to flow into first chamber 41 therethrough. The first chamber 41 is then completely filled with oil, pressurised by the action of the venturi nozzle 45. The obturating member 64 prevents oil being forced into duct 60 when the device is being filled under pressure.

A backing or auxiliary pump, not shown, is provided in the external circuit to maintain the external circuit full of oil and to provide a constant supply of oil under pressure to the inlet side of main pump 22. The action of the backing pump provides a continuous flow of oil from first chamber 41 through outlet 30, returning to the first chamber 41 via inlet 31. Some of the oil so circulated is lost through leakage (e.g. five gallons per hour of a total circulation of fifty gallons per hour) but the action of the venturi nozzle 45 is such that oil is induced to flow from second chamber 42, mingling with the oil returning to the first chamber through tube 44, to compensate for this loss. Thus despite a continuous circulation of oil, and a continuous loss of oil, the first chamber 41 is at all times maintained completely filled with oil, such that no air is present (the air being forced out through vent 53), and consequently no air can mingle with the oil passing through outlet 30. Air is thus prevented from entering the closed external circuit, and "spongy" operation of rams 18 is avoided.

When it is desired to operate doors 17, valve 23 is actuated to reverse the flow of oil in pipes 24 and 25, the main pump 22 then pumping oil into rams 18 through pipe 24. The rams move to the right (as seen in FIGURE 1) and the doors close to restrict the cross-sectional area of the outlet nozzle 16. The volume of oil available in tank 21, in all three chambers 41, 42 and 43, is such as to provide an adequate supply of oil for operating rams 18. Thus adequate oil to compensate for losses and for the oil displaced by the piston rods of rams 18 when in their retracted positions must be provided. If the maximum drain on the tank 21 is calculated to be, say, 0.7 pint, then a tank capacity of, say, 2.5 pints may be provided to more than adequately compensate for the loss.

It will be appreciated that, as oil is drained from first chamber 41, this will be replaced from second chamber 42, and this in turn will be replaced from third chamber 43.

FIGURES 3 to 7 illustrate the behavior of the tank 21 under various dispositions of the tank. The figures are not wholly consistent with FIGURE 2 since components have been somewhat re-arranged for the sake of clarity. Thus tubes 50 and 51 have been represented as being relatively straight instead of twisted as seen in FIGURE 2.

FIGURE 3 corresponds to FIGURE 2, and shows the arrangement of the tank and the relative levels of oil in the tank whilst the tank remains in a substantially vertical (i.e. normal) disposition. Should the aircraft in which engine 10 is installed, roll over or loop and thus invert tank 21, then the situation illustrated in FIGURE 4 arises. In FIGURE 4, the worst possible situation has been illustrated, in which the tank is inverted and the rams 18 are operated, thus draining the maximum quantity of oil from tank 21. As seen in FIGURE 4, the air pocket normally adjacent valves 57, 58, in third chamber 43 moves to the "bottom" of third chamber 43, adjacent end wall 35. The level of oil in third chamber 43 is indicated at 80, and this is seen to be below the level of the end of tube 50. Thus no oil can be supplied from third chamber 43 to second chamber 42. Consequently, the drain of oil required due to actuation of rams 18 is provided by second chamber 42 to maintain first chamber 41 full, and thus the oil level in second chamber 42 (which is normally completely full also) falls to the level indicated at 81, providing an air pocket 82 above this level.

Upon reverting to the normal upright position, tank 21 appears as in FIGURE 5. The air pocket 82 moves up second tank 42 until it reaches the upper end, adjacent venturi nozzle 45. The flow of oil through inlet 31 and tube 44 thus induces air to flow into first chamber 41. However, the air naturally travels to the surface of the oil in first chamber 41, filling tube 51, and flowing into third chamber 43 through vent 53. The system thus reverts to the situation illustrated in FIGURE 3 very rapidly, with first tank 41 being completely full of oil, and with all the air removed from second tank 42. Any air "trapped" above venturi nozzle 45 is removed through vent 71 which is at the uppermost point of second chamber 42. Thus, although a little air is introduced into first chamber 41 during this procedure, it is so small that the first chamber is still substantially completely full of oil, and no air enters the oil leaving the outlet 30, since this is disposed adjacent the lowermost portion of the first chamber.

FIGURES 6 and 7 illustrate the situations arising when the aircraft climbs and dives respectively. It will be seen that it is only the oil within third chamber 43 that alters, being indicated at 84, the second and third chambers being maintained completely full in these positions.

It will be appreciated that, by maintaining the first chamber 41 substantially full of oil at all times, the oil in the system is effectively prevented from entering into suspension under such conditions as zero "g" which may be experienced in flight, and a continuous supply of oil even under negative "g" conditions is ensured.

The oil "lost" through leakage from any part of the external circuit may be trapped and pumped back to third chamber 43 via pipe 56. This oil flows through tube 55 and into third chamber 43 without affecting the operation of the device in any way.

Referring now to FIGURE 8 there is shown an alternative oil tank according to the present invention. This tank is very similar to that of FIGURES 1 to 7 and therefore will not be described in detail. Similar components are given similar reference numerals in all drawings. The main difference between the two embodiments is the positioning of inlet 31 with its associated tube 44 and venturi ejector pump or nozzle 45. Whereas in the embodiment of FIGURES 1 to 7 the inlet 31 led oil directly into chamber 41, inducing oil to flow from chamber 42, in the present arrangement, shown in FIGURE 8, the inlet 31 leads oil into chamber 43, discharging the oil into the air space above the level 72 of oil within chamber 43.

Referring to FIGURE 8, it will be seen that the upper end of chamber 42 is provided with a gravity valve 52' having an air outlet 53' which communicates with the apertures 46 (not shown) of venturi nozzle 45 via a pipe 51'. A supply tube 73 leads from chamber 42 into chamber 41. In operation, oil fed into inlet 31 flows into chamber 43, inducing air to flow from chamber 42 through air outlet 53' and pipe 51' under the influence of venturi pump 45, the air mingling with the oil flowing into chamber 43. The suction effect upon chamber 42 induces oil to flow from chamber 43, through tube 50 and into chamber 42 thus maintaining this chamber full, or substantially full of oil at all times. The effect of oil leaving outlet 30 will also have a suction effect upon chamber 41 thus drawing oil into this chamber through tube 73 from chamber 42 and maintaining it full or substantially full of oil at all times.

The gravity valve 52' is so arranged that, during inverted flight, the valve prevents oil passing through outlet 53', pipe 51' and thus into chamber 43 under the influence of ejector pump 45. Thus the risk of oil being pumped out of chamber 42 is reduced and this chamber is maintained full. The gravity valve permits air to be extracted from chamber 42 during all other flying conditions.

By disposing the inlet 31 in communication with chamber 43, as opposed to chamber 41, a much reduced rate of oil flow may be used while the incoming air and oil will be entering a chamber of much larger volume and also still retaining efficient operation of the system. Thus an oil flow of the order of 5 gallons per hour may be employed instead of 50 gallons per hour suggested with the embodiment of FIGURES 1 to 7. With a chamber of larger volume and a reduced flow rate, the oil and air are given more time to separate and thus the chances of the oil and air forming an emulsion are reduced and this will not affect the system, making operation of rams 18 "spongy."

The leakage return duct 56 of the FIGURE 8 embodiment is seen to be blanked off by a plug 56'. Leakage of oil from the external circuit is collected in a reservoir and returned to the supply pipe leading to inlet 31. Thus the amount of oil entering through inlet 31 will be substantially equal to the amount of oil leaving outlet 30. It will be appreciated that the air contained within the leakage oil entering inlet 31 will not adversely affect operation of the tank, as it may well have done in the embodiment of FIGURES 1 to 7, since the leakage oil and air does not flow directly to chamber 41, but flows into the tank 43 in which it separates.

Referring now to FIGURE 9, this embodiment is similar to the embodiment of FIGURE 8 except that the tank is divided into two chambers only, the dividing wall 40 being omitted. Also, a modified U-tube 50' is provided to connect the chambers together. It will also be noted that outlet 30 is disposed substantially centrally of tank 41 such that it is spaced from the air trap above level 70 by similar amounts when the aircraft is upright or inverted. Also, the outlet 30 extends into the tank such that, when the aircraft is diving, the air trap which will be disposed adjacent wall 33, will not communicate with the outlet, and thus the outlet will always be submerged in oil, the risk of air being withdrawn with the oil being reduced yet further. This arrangement can, of course, be used with all embodiments.

It will be appreciated that the tanks described above may take many forms without departing from the scope of the invention. Thus, particularly when used with gas turbine engines and intended to be mounted on the cylindrical engine casing, the side walls (e.g. 33) may be arcuate to follow the line of the engine casing, and the tanks may be shaped to fit in any available space. The chambers 41 to 43 need not be of the shapes indicated, but could be of any shape provided the manner in which they are connected is such as to maintain the chamber 41 full of oil.

Again, the invention is not restricted to oil tanks for engines. Any tank for holding liquid can be formed in accordance with the present invention. Thus in any device in which it is desired to maintain a supply of air-free liquid, the present invention may be used. The invention is particularly suitable for use with tanks which are subject to widely differing movements and dispositions (e.g. inverted positions) such as those obtained on an aircraft.

We claim:

1. A tank for holding liquids, said tank comprising a plurality of interconnecting chambers, a liquid inlet and a liquid outlet by which liquid may be respectively supplied to and withdrawn from said chambers, the liquid inlet and liquid outlet both communicating directly with one of said chambers to draw liquid therefrom, an air outlet for said chambers, and a venturi ejector pump in said liquid inlet, the liquid inlet passing through a second of said chambers whereby the liquid flowing through said inlet draws further liquid from said second chamber by the venturi ejector pump, the combined liquid and further liquid passing into this said one chamber urging air out through said air outlet and maintaining said one chamber substantially full.

2. A tank as claimed in claim 1 wherein there is provided a third chamber adapted to contain liquid, and communicating with said second chamber to supply liquid thereto.

3. A tank as claimed in claim 1 and comprising two chamber, the other chamber communicating with said one chamber, the other chamber communicating with said one chamber to supply liquid thereto, the said liquid inlet communicating with the other chamber, and the venturi ejector pump being connected to said air outlet whereby flow of liquid into said other chamber draws air from said one chamber and thus induces liquid to flow into said one chamber, maintaining it substantially full.

4. A tank as claimed in claim 1 in which the said liquid inlet communicates with a third one of said chambers in said tank, said third chamber communicating with said one chamber via a second one of said chambers, an air outlet is provided in said chamber, and the venturi ejector pump is connected to said air outlet whereby flow of liquid into said third chamber draws air from said second chamber and thus induces liquid to flow into said second chamber, maintaining it and said one chamber substantially full.

5. A tank as claimed in claim 2 and further comprising a U-tube inverted in the normal disposition of said tank and interconnecting the second and third said chambers.

6. A tank as claimed in claim 3 and further comprising a U-tube inverted in the normal disposition of the tank and interconnecting the said two chambers.

7. A tank as claimed in claim 1 having at least two interconnecting chambers and a further chamber only partially filled with liquid, the remainder of said further chamber being filled with compressed gas to pressurise the liquid in said chambers.

8. A tank as claimed in claim 7 wherein said air outlet is a one-way air valve which permits air to flow from one of said chambers into said further chamber which is only partially filled with liquid.

9. A tank as claimed in claim 1 and having three interconnecting chambers, the tank being formed of internal and external casings between which one of said chambers is defined, and a dividing wall dividing said internal casing internally to provide the remaining two chambers.

10. A tank as claimed in claim 1 including a closed external liquid circuit to which said inlet and outlet are connected, means being provided for returning to said tank at least some of the liquid lost from said external circuit.

11. In a gas turbine engine according to claim 1, a variable area nozzle and rams for operating said nozzle, the said tank holding liquid for operating said rams.

12. A tank for holding liquids, said tank comprising a plurality of interconnecting chambers, a liquid inlet and a liquid outlet by which liquid may be respectively supplied to and withdrawn from said chambers, the liquid outlet communicating directly with one of said chambers to draw liquid therefrom, an air outlet for said chambers, and a venturi ejector pump in said liquid inlet and within one of said chambers whereby said venturi ejector pump causes further liquid to be drawn into said inlet from a second of said chambers and liquid flowing through said inlet into said chambers causes air to pass out of said chambers through said air outlet, so that at least one chamber is maintained substantially full of liquid in any disposition of said tank.

13. In a gas turbine engine, a compressor and a tank for holding liquids pressurized by air from said compressor, said tank comprising a plurality of interconnecting chambers, a liquid inlet and a liquid outlet by which liquid may be respectively supplied to and withdrawn from said chambers, the liquid inlet and liquid outlet both communicating directly with one of said chambers to draw liquid therefrom, an air outlet for said chambers, and a venturi ejector pump in said liquid inlet, the liquid inlet passing through a second of said chambers whereby the liquid flowing through said inlet draws further liquid from said second chamber by the venturi ejector pump, the combined liquid and further liquid passing into this said one chamber urging air out through said air outlet and maintaining said one chamber substantially full.

14. A tank for holding liquids, said tank comprising at least two interconnecting chambers and a further chamber only partially filled with liquid, the remainder of said further chamber being filled with compressed gas to pressurize the liquid in the chambers, a liquid inlet and a liquid outlet by which liquid may be respectively supplied to and withdrawn from said chambers, the liquid outlet communicating directly with one of said chambers to draw liquid therefrom, an air outlet for said chambers, said air outlet comprising a one-way air valve which permits air to flow from one of said chambers into said further chamber which is only partially filled with liquid, and a venturi ejector pump in said liquid inlet such that liquid flowing through said inlet into said chambers causes air to pass out of said chambers through said air outlet, thereby maintaining at least one of said chambers substantially full of liquid.

References Cited
UNITED STATES PATENTS

| | | | |
|---|---|---|---|
| 2,379,579 | 7/1945 | Hunter | 137—171 X |
| 2,740,267 | 4/1956 | Bayard | 60—39.08 |
| 2,866,313 | 12/1958 | Holl | 60—271 X |

CARLTON R. CROYLE, *Primary Examiner.*

U.S. Cl. X.R.
60—39.48, 271; 137—173.209